United States Patent
James et al.

(10) Patent No.: US 10,435,307 B2
(45) Date of Patent: Oct. 8, 2019

(54) EVAPORATOR FOR SAGD PROCESS

(71) Applicants: Kenneth James, Calgary (CA); Bob Nabata, Calgary (CA)

(72) Inventors: Kenneth James, Calgary (CA); Bob Nabata, Calgary (CA)

(73) Assignee: Private Equity Oak LP, Edmonton, Alberta (CA)

( * ) Notice: Subject to any disclaimer, the term of this patent is extended or adjusted under 35 U.S.C. 154(b) by 831 days.

(21) Appl. No.: 14/594,884

(22) Filed: Jan. 12, 2015

(65) Prior Publication Data

US 2015/0122631 A1    May 7, 2015

Related U.S. Application Data

(63) Continuation-in-part of application No. 13/074,265, filed on Mar. 29, 2011, now Pat. No. 9,028,655.
(Continued)

(51) Int. Cl.
  *C02F 1/04* (2006.01)
  *B01D 17/02* (2006.01)
(Continued)

(52) U.S. Cl.
  CPC ............ *C02F 1/048* (2013.01); *B01D 1/0082* (2013.01); *B01D 1/065* (2013.01); *B01D 1/28* (2013.01);
(Continued)

(58) Field of Classification Search
  CPC .......... B01D 1/2818; B01D 1/28; B01D 1/06; B01D 1/065; B01D 1/08; B01D 1/10;
(Continued)

(56) References Cited

U.S. PATENT DOCUMENTS 1,617,082 A    2/1927  Price
2,310,649 A    2/1943  Peebles
(Continued)

FOREIGN PATENT DOCUMENTS

CA    2 547 503 A1    6/2005
CA    2 609 859 A1    5/2009
(Continued)

*Primary Examiner* — Jonathan Miller
*Assistant Examiner* — Jonathan Luke Pilcher
(74) *Attorney, Agent, or Firm* — Fay Sharpe LLP

(57) ABSTRACT

A closed loop contaminant control system for an evaporative water purification process at an oil recovery facility includes an evaporator having a water inlet, a distilled water discharge, and an oil and brine water discharge. A sump in the evaporator is divided by an oil skimming weir into a main sump and a blowdown sump, with the oil and brine water discharge located proximate the blowdown sump and the steam discharge located above the oil and brine discharge. A distillate tank receives distilled water from the evaporator and discharges the distilled water. The distillate tank has a level controller, other controllers provided for the system include a distilled water flow meter, a blowdown flow meter, a cycle controller, a total flow controller, a hardness controller, and a silica controller.

19 Claims, 15 Drawing Sheets

Related U.S. Application Data which is a continuation-in-part of application No. 13/087,708, filed on Apr. 15, 2011, now Pat. No. 8,951,392.

(60) Provisional application No. 61/436,723, filed on Jan. 27, 2011, provisional application No. 61/376,301, filed on Aug. 24, 2010.

(51) Int. Cl.
| | |
|---|---|
| *C02F 1/08* | (2006.01) |
| *B01D 1/28* | (2006.01) |
| *B01D 1/00* | (2006.01) |
| *B01D 1/06* | (2006.01) |
| *E21B 43/34* | (2006.01) |

(52) U.S. Cl.
CPC ............ *B01D 17/0214* (2013.01); *C02F 1/08* (2013.01); *C02F 1/04* (2013.01); *E21B 43/34* (2013.01); *Y10S 159/901* (2013.01); *Y10S 203/18* (2013.01)

(58) Field of Classification Search
CPC .. B01D 1/12; B01D 17/0214; B01D 19/0021; B01D 3/322; B01D 17/0211; B01D 1/26; B01D 17/04; C02F 1/40; C02F 2103/365; C02F 1/04; C02F 1/041; C02F 1/043; C02F 1/048; C02F 1/06; C02F 1/08; C02F 1/042; C02F 1/045; C02F 1/046; C02F 1/047; C02F 1/10; C02F 1/12; C02F 1/14; C02F 1/16; C02F 1/18; C02F 1/24; C02F 2103/10; E21B 43/2408; E21B 43/34; E21B 43/40
USPC ............... 159/13.2, 43.1, 42; 203/20, 39, 42
See application file for complete search history.

(56) References Cited

U.S. PATENT DOCUMENTS

| | | | |
|---|---|---|---|
| 2,920,039 A | 1/1960 | Miller | |
| 3,155,600 A | 11/1964 | Williamson | |
| 3,632,315 A * | 1/1972 | Uitti | B01D 11/043 422/256 |
| 3,778,969 A | 12/1973 | Sudduth | |
| 3,819,054 A | 6/1974 | Long et al. | |
| 4,002,538 A | 1/1977 | Pottharst, Jr. | |
| 4,007,921 A | 2/1977 | Zingg | |
| 4,120,158 A | 10/1978 | Sheinbaum | |
| 4,205,962 A | 6/1980 | Marion et al. | |
| 4,269,776 A | 5/1981 | Keunecke et al. | |
| 4,428,328 A | 1/1984 | Ratliff | |
| 4,683,025 A | 7/1987 | Flores | |
| 4,880,533 A | 11/1989 | Hondulas | |
| 4,924,936 A | 5/1990 | McKown | |
| 4,938,876 A | 7/1990 | Ohsol | |
| 5,195,587 A | 3/1993 | Webb | |
| 5,221,439 A | 6/1993 | Li et al. | |
| 5,236,605 A | 8/1993 | Warncke | |
| 5,303,725 A | 4/1994 | Hilgren | |
| 5,415,673 A | 5/1995 | Hilton et al. | |
| 5,456,823 A * | 10/1995 | Lermite | B01D 1/06 208/187 |
| 5,516,119 A | 5/1996 | Trackwell et al. | |
| 5,762,416 A | 6/1998 | LeSire | |
| 5,906,714 A * | 5/1999 | Gramkow | B01D 1/2881 159/24.1 |
| 5,948,242 A | 9/1999 | Ohsol et al. | |
| 6,019,818 A | 2/2000 | Knapp | |
| 6,199,834 B1 | 3/2001 | Popov et al. | |
| 6,234,760 B1 | 5/2001 | Popov et al. | |
| 6,244,098 B1 | 6/2001 | Chen et al. | |
| 6,315,000 B1 | 11/2001 | Goodyear | |
| 6,418,957 B1 | 7/2002 | Goodyear | |
| 6,536,523 B1 | 3/2003 | Kresnyak et al. | |
| 6,938,583 B2 | 9/2005 | Wood | |
| 7,306,057 B2 | 12/2007 | Strong et al. | |
| 7,326,285 B2 | 2/2008 | Chowdhury | |
| 7,591,309 B2 | 9/2009 | Minnich et al. | |
| 7,647,976 B2 | 1/2010 | Tsilevich | |
| 7,670,573 B2 | 3/2010 | Stell et al. | |
| 7,681,643 B2 * | 3/2010 | Heins | E21B 43/24 159/24.1 |
| 7,814,933 B2 | 10/2010 | Khang et al. | |
| 8,852,394 B2 * | 10/2014 | Panz | B01D 1/14 122/31.2 |
| 2002/0043289 A1 | 4/2002 | Goodyear | |
| 2002/0088703 A1 | 7/2002 | Walker | |
| 2002/0184784 A1 | 12/2002 | Strzala | |
| 2007/0007172 A1 | 1/2007 | Strack et al. | |
| 2007/0051513 A1 * | 3/2007 | Heins | E21B 43/40 166/265 |
| 2008/0093264 A1 | 4/2008 | Sarkar et al. | |
| 2008/0110630 A1 | 5/2008 | Minnich et al. | |
| 2009/0008334 A1 | 1/2009 | Schoen et al. | |
| 2009/0020456 A1 | 1/2009 | Tsangaris et al. | |
| 2009/0084707 A1 | 4/2009 | Gil | |
| 2010/0058771 A1 | 3/2010 | Gil et al. | |
| 2010/0181184 A1 | 7/2010 | Bahr | |
| 2011/0036308 A1 | 2/2011 | Betzer-Zilevitch | |
| 2011/0061816 A1 | 3/2011 | Duesel, Jr. et al. | |
| 2011/0089013 A1 * | 4/2011 | Sakurai | B01D 17/0205 201/2 |
| 2012/0000642 A1 | 1/2012 | Betzer Tsilevich | |
| 2012/0179624 A1 | 7/2012 | Berry et al. | |
| 2012/0192716 A1 | 8/2012 | Chen et al. | |
| 2014/0144788 A1 | 5/2014 | Barton | |

FOREIGN PATENT DOCUMENTS

| | | |
|---|---|---|
| CA | 2 610 052 A1 | 5/2009 |
| WO | WO 2005/054746 A2 | 6/2005 |
| WO | WO 2008/098242 A2 | 8/2008 |

* cited by examiner

EVAPORATOR FOR SAGD PROCESS

This application is a Continuation-In-Part of application Ser. No. 13/074,265 which was filed on Mar. 29, 2011 and issued into U.S. Pat. No. 9,028,655 on May 12, 2015. That application, in turn, claims priority from Provisional Application Ser. No. 61/376,301 which was filed on Aug. 24, 2010. This application is also a Continuation-In-Part of application Ser. No. 13/087,708 which was filed on Apr. 15, 2011 and issued into U.S. Pat. No. 8,951,392 on Feb. 10, 2015. That application, in turn, claims priority from Provisional Application Ser. No. 61/436,723 which was filed on Jan. 27, 2011. The subject matter of each of those applications is incorporated hereinto in its entirety.

BACKGROUND

Recently, evaporators have been adopted as an alternate water treatment system in oil recovery facilities, such as, for example, to treat produced water from a Steam Assisted Gravity Drainage (SAGD) facility or water discharge from a Hydraulic Fracture Oil Recovery Process (fracking). The control system enables the control of contaminants in the water which contaminants are introduced through and/or are specific to the particular oil recovery process in question. The contaminant control schemes developed are also applicable to Mechanical Vapor Compression (MVC) evaporator systems employed in other applications, especially those with a potential hydrocarbon or compressor fouling problem.

Water is used in many industrial processes for a variety of applications such as steam production, cooling, washing, diluting, scrubbing, and the like. In oil recovery processes, increased efforts have been made to conserve water by maximizing the reuse of process water and hence reducing the amount of waste water which is being discharged and thereby also minimizing the amount of fresh water introduced as make-up water. This result is both economical and has environmental benefits. However, reusing process water has its own challenges since generally the process water is contaminated in its initial use and requires additional treatment such as filtration, sedimentation, flocculation, evaporation, or chemical treatment before it can be reused. Treatment of the process water for reuse must in itself be efficient and economical before it will occur, with the extent of such treatment being determined by the intended use of the water.

One known treatment method is termed Mechanical Vapor Compression (MVC) evaporation. In this known method, a compressor is utilized to produce the pressure and temperature differential necessary to drive a known falling film exchanger to produce a high purity distilled water product and a concentrated brine product. One example of such a known system is illustrated in FIG. 1 herein.

Evaporators have been used extensively in the mining industry as well as in the pulp and paper industry in order to concentrate solids into a brine and/or to recover water from waste streams. In these applications, the solid contaminants are generally soluble in water. However, in oil recovery processes that is not the case. For example, in the SAGD process, as a result of injecting steam into an underground reservoir that is recovered as hot water with the production fluids, contaminants will be introduced into the water in various concentrations. Oil and water soluble solids present in the reservoir may cause variances in the quality of the produced water at any given time. This can lead to operating problems in standard evaporator designs.

In the SAGD industry, the produced water recovered from the SAGD production fluids, and make-up water added to account for losses, must be treated to remove various contaminants in order to meet boiler feed water specifications. The contaminants can include water hardness, silica, minerals, and residual oil/bitumen. If the water hardness, silica, and minerals are not removed from the water prior to steam generation via a boiler, they will precipitate in the boiler causing reduced heat transfer, lower capacities, higher boiler tube temperatures, and extended boiler outages, as the boiler needs to be cleaned and repaired and, ultimately, failure of the boiler. If the residual oil/bitumen is not removed from the brine in the evaporator sump, there will be foaming and fouling issues in the evaporator exchanger and sump, again leading to process upsets and shutdowns of the system.

The typical problems in evaporators in SAGD facilities include hardness scaling; silica deposits; oil accumulation and foaming; poor internal mist elimination performance; compressor vibration and scaling caused by foaming; and a large size for the evaporator, preventing the use of SAGD evaporators in mobile systems.

Hardness (mineral ions such as $Ca^{2+}$ or $Mg^{2+}$), scaling, and silica deposits can be controlled by limiting the concentration, increasing the pH of the water, or adding scale inhibitors such as calcium sulfate seed crystals. They can also be addressed by controlling the water recirculation through the falling film heat exchanger.

The majority of SAGD production facilities utilize hot or warm lime softening systems combined with Weak Acid Cation (WAC) ion exchange systems in order to treat produced and make-up water. However, this process does not produce a high quality boiler feed water and necessitates the use of Once Through Steam Generators (OTSG) which only partially boil the feed water (75-80%) in order to prevent scale deposition (by maintaining solids in solution in the unboiled water). This leads to energy inefficiency and excessive water disposal rates. Once through steam generators are custom built for the oil sands industry making them very costly compared to conventional boilers.

Recently, some SAGD operators have adopted falling film evaporators that produce a high quality distilled water for boiler feed water. This has made it possible to shift to more conventional drum boilers in the SAGD industry. The combination of falling film evaporators and drum boilers results in much higher water recycle rates ("WRR") in an SAGD facility. This is becoming an increasingly critical environmental consideration.

However, operating companies are finding that there are many shortcomings with the current industry practice and evaporator system when employed in SAGD facilities. Improvements to the current state of falling film evaporator design for an SAGD water treatment system have focused on the five most problematic technical issues that have been observed in the field. These include:

1) preventing accumulation of hydrocarbons in the evaporator sump;

2) ensuring silica, calcium, and other water soluble contaminants are maintained in solution to prevent scaling on the evaporator heat transfer tubes;

3) selecting materials of construction suitable to the environment including high levels of chlorides in the evaporator sump due to the use of non-portable saline make-up water, pH levels in the sump, and/or the need to concentrate the brine to maximize water recycling;

4) minimizing power consumption in a water treatment unit, wherein all of the recovered water is evaporated and recondensed; and, 5) minimizing corrosion in the compressor and the suction piping to the compressor caused by the brine liquid carry-over into the compressor.

One unique shortcoming not addressed by known current designs is the tendency of residual oil (including hydrocarbons, heavy oil, or SAGD emulsifiers/reverse emulsifiers) to accumulate in the evaporator sump. The typical designs withdraw a brine blowdown from the evaporator sump at the outlet of the evaporator recirculation pump. Owing to its lower density, oil will tend to slowly build up upon the surface of the water in the evaporator sump. To control accumulation of dissolved solids in the evaporator sump, a controlled volume of water is removed from the system at the discharge of the brine recirculation pump. However, oil that accumulates on the surface of the water in the evaporator sump cannot enter the brine recirculation pump since the pump suction line is drawn from the bottom of the evaporator sump. The accumulation of oil on the surface to the evaporator sump will lead to "foaming" events in the evaporator sump, fouling of heat exchange surfaces in the evaporator exchanger leading to a shutdown of the evaporator system in order to withdraw accumulated oil in the evaporator sump. The need to shut down the evaporator in order to deal with foaming events reduces the overall reliability of the SAGD plant and reduces the production volumes. It would thus be desirable to remove the oil that accumulates on the surface of the water in the evaporator sump on a continuous basis in order to prevent the foaming effect.

The operation of the evaporator is time and labor consuming and has to be highly controlled before, during, and after the operation. A typical control scheme for an evaporator includes the following factors:

1) The blowdown flow set point is changed by an operator in response to a lab analysis of the concentration of solutes (silica, chloride, etc.) in the evaporator sump so that the concentration of solutes is controlled manually.

2) The evaporator feed rate is adjusted automatically by a sump level controller in response to changes in sump level.

3) The compressor speed and or guide vane position is adjusted in response to the level of water in the distillate tank.

4) The production rate of distillate water from the evaporator is changed slowly in response to the level of the downstream tank. In extremes, the production rate is changed in response to the level of the feed tank.

5) Start up and shut down of the evaporator is done manually, causing significant time pressures on the operator. The mode changes, especially at startups, and the response time immediately after a trip or malfunction are the most dangerous times in a process plant.

6) Operators may make manual adjustments to rates to manage the inventories in 1) the upstream produced water tank which feeds the evaporator and 2) the downstream boiler feed water tank that holds the evaporator product distillate water.

In an attempt to deal with oil accumulation in the evaporator sump, conventional designs have tried to employ a skim draw at some specific level in the sump. However, this scheme can only be effective if the sump level is precisely controlled at a level just above the skim draw nozzle. If the level is too high above the draw point, oil will accumulate. If, on the other hand, the level falls below the draw nozzle, no liquid flow will be drawn off and again oil will accumulate. As mentioned, oil accumulated in the evaporator sump causes excessive foaming. Anti-foam chemicals are then added to the feed water but the addition may not be adequate to deal with excessive foam caused by oil accumulating in the sump. In addition, antifoam chemicals are typically light hydrocarbons themselves, which will also accumulate in the evaporator sump, and will eventually aggravate the hydrocarbon foaming issue rather than resolving it.

The known MVC evaporator has a vessel designed to separate the liquid brine and steam that is produced in the tube side of the evaporator exchanger. This can be in the evaporator sump or in a dedicated compressor knockout drum located between the evaporator sump and the compressor section. In either case, removal of the entrained brine can be increased through known design parameters utilizing proper vessel sizing, demist pads with water wash, and chevron mist eliminators. However, there is a residual amount of brine which will be carried through these devices. These droplets will be carried into the compressor whereas a result of the heat of compression in the compressor, the outlet steam from the compressor is super-heated. This ensures that in the compressor, the brine droplets are evaporated, depositing the dissolved minerals as a salt on the surfaces of the compressor, and resulting in corrosion problems in the compressor. There are some designs that recycle the super-heated compressed discharge back to the compressor section for the sole purpose of evaporating any liquid droplets in the feed to the compressor. This moves the vaporization of the brine droplets back from the compressor into the compressor suction piping, resulting in the deposition of salts in the compressor piping and causing corrosion of the suction piping. It would be desirable to reduce the amount of brine carried through these devices. It would also be desirable to reduce the amount of oil which is accumulated in the evaporator sump.

The implementation of existing technology involves a vertical exchanger bundle mounted on top of an evaporator sump. The sump provides both liquid inventory for the brine recirculation pumps and vapor space for liquid/vapor disengagement. Mist eliminators are typically installed in the vapor space in the annulus area around the falling film heat exchanger bundle, above which is located outlet piping to the compressor suction. As a result, the evaporator is very tall relative to other SAGD equipment and has a vessel diameter which is significantly larger than that of the falling film exchanger. These dimensional features restrict the equipment capacity that can be easily modularized and transported. High labor costs and low productivity, which are typically associated with SAGD operations, have driven owners to seek modular construction techniques to minimize site construction. This has created a need for new evaporator designs for use in the modular SAGD technology/market development addressing all of the above-mentioned deficiencies.

BRIEF SUMMARY

Recently, evaporators have been adopted as an alternate water treatment in the heavy oil industry to treat produced water from a Steam Assisted Gravity Drainage ("SAGD") facility. This resent disclosure introduces means of controlling contaminants in water that are introduced through and/or are specific to the SAGD process. It should be recognized, however, that the contaminant control schemes developed are also applicable to mechanical vapor compression (MVC) evaporator systems in other applications, especially those with potential hydrocarbon or compressor fouling issues.

According to one embodiment of the present disclosure, a closed loop contaminant control system for an evaporative water purification process at an oil recovery facility comprises an evaporator having a bottom, a water inlet, a distilled water discharge, a steam discharge, an oily water discharge and brine water discharge. A sump is provided at the bottom of the evaporator proximate the oily water discharge and the brine water discharge thereof. An oil skimming weir divides the sump into a main sump and a blowdown sump wherein the oily water discharge is located proximate the blowdown sump. The steam discharge is located above the oil skimming weir. A wash tray adapted to wash the steam is provided to wash the steam before it exits from the evaporator. Also provided are a plurality of controllers including a distilled water flow meter located proximate the distilled water discharge of the evaporator and a blowdown flow meter measuring a flow from the blowdown sump leaving the evaporator. A cycle controller calculates a ratio between a distilled water flow and a blowdown flow. A total flow controller is provided along with a hardness controller for providing a set point of the cycle controller affecting the flow of make-up water into the evaporator. A silica controller is employed for providing a set point for an inlet pH controller utilizing a flow of caustic in order to adjust the pH of the water in the system.

According to another aspect of the present disclosure, a process is provided for retarding foaming in an evaporative water purification system utilized in an oil recovery facility. The process comprises providing an evaporator including a sump and a weir and employing the weir to divide the sump into a main sump and a blowdown sump. Brine, including oil, is flowed over the weir from the main sump into the blowdown sump. Brine is discharged from the main sump and is circulated to the evaporator exchanger. Oil is discharged from the blowdown sump and exits the system. Steam is also discharged from the evaporator.

According to another embodiment of the present disclosure, a closed loop contaminant control system for an evaporative water purification process for an oil recovery facility comprises an evaporator including a sump, a water inlet, a distilled water discharge, a steam and distilled water discharge, and an oily water and a brine water discharge. An oil skimming weir divides the sump into a main sump and a blowdown sump. The brine water discharge communicates with the main sump and the oily water discharge communicates with the blowdown sump. A distillate tank is provided for receiving steam and distilled water from the evaporator and for discharging the distilled water. The distillate tank is adapted to receive the steam and distilled water from the evaporator and is adapted to discharge distilled water and steam at two separate locations. The distillate tank has a level controller for controlling the energy supplied to the evaporator and the distilled water production. A wash tray is provided for washing the steam before discharge of the steam from the distillate tank.

DETAILED DESCRIPTION

Figure 1:
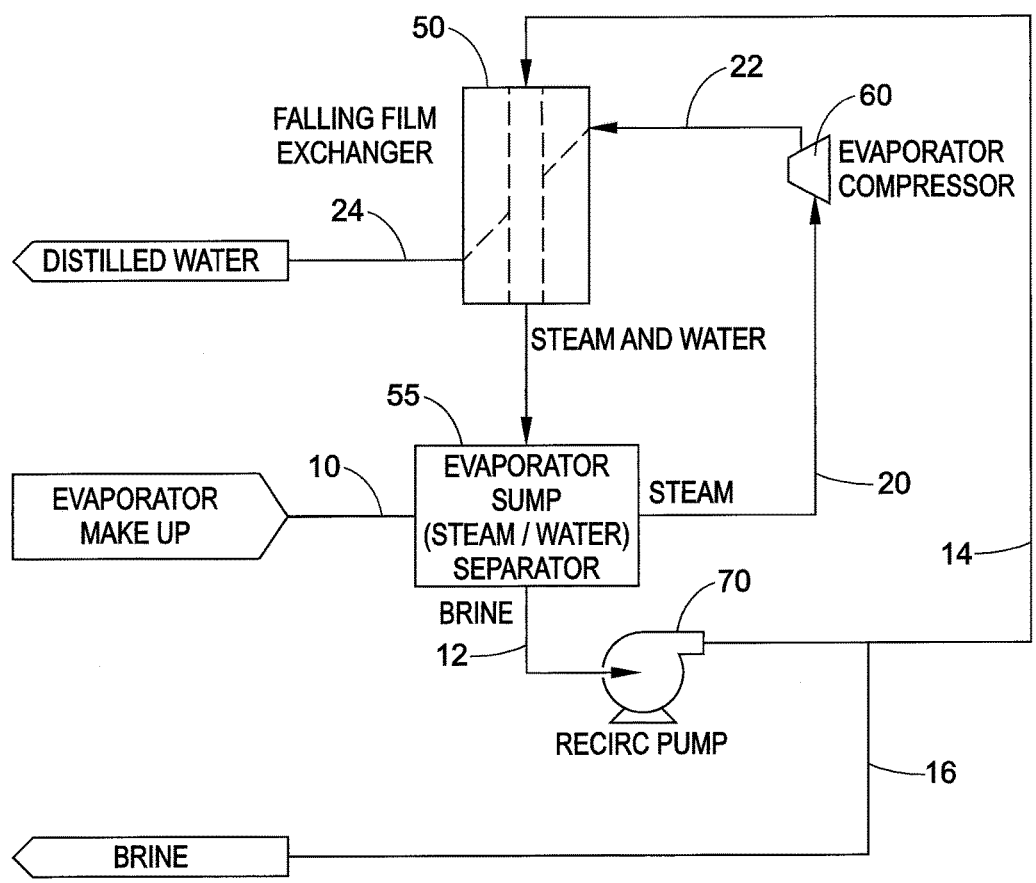
FIG. 1 is a schematic flow diagram of a known mechanical vapor compression (MVC) evaporator currently used in an SAGD facility.

The control schemes and equipment designs included in this disclosure can be readily adapted to a variety of MVC Evaporator designs commercially available. In one embodiment, the disclosure is specifically designed to improve the performance of MVC evaporator technology in a SAGD process facility. Other embodiments of the disclosure can be applied to other MVC evaporator applications, especially those with hydrocarbon present or with compression corrosion issues. These applications include fracking water recovery, heavy oil produced water recovery, tailings pond clean-up, etc.

Hydraulic fracturing to liberate gas and oil has become very popular. In water stress areas, all users of water have been under pressure to successfully manage scarce water resources. Adding hydraulic fracturing to the equation has aggravated the situation. For example, many fracking companies in a state like Texas where drought is a major problem are facing pressure from regulators to reduce the amount of water they use in their fracking fluids. One way to reduce water usage is to use reclaimed water from the fracking process. In order to successfully reuse such water, one must remove hydrocarbons from the water. In addition, chloride needs to be removed as well. Ideally, up to 80% of the fracking water can be recycled or reused if it is successfully treated to remove hydrocarbons and chloride. Various states are now imposing rules on drilling companies in order to encourage or mandate such recycling.

The shale gas boom has led to exponential increases in water usage. A driller can easily use a million gallons or more in a fracturing operation. As water becomes scarce and disposing of the water becomes more expensive, the industry is showing increased interest in voluntarily recycling the waste water produced. Thus in areas having limited access to fresh water during drought conditions added to the cost of disposal and environmental scrutiny all militate in favor of recycling of the water used during fracking operations.

In many regions of the world heavy oil, a hydrocarbon material having a much higher viscosity or lower API gravity (less than 20° API, typically 7° to 12° API) than conventional petroleum crude is more difficult to recover and requires enhanced thermal stimulation techniques of the subsurface reservoir in order to produce the oil. In current systems for heavy oil recovery, a significant amount of water needs to be employed. Recovering that water for reuse is clearly beneficial for some of the reasons outlined above. Public and regulatory pressures require that heavy oil producers implement water recovery and reuse practices. In some facilities a zero effluent discharge may be required. This means that up to 100% of the water used must be recovered and reused so as to eliminate or greatly reduce off-site disposal of effluent or waste water, which is contaminated with dissolved solids such as sodium chloride and suspended silica as well as some amount of oil and a variety of other materials.

Figure 2:
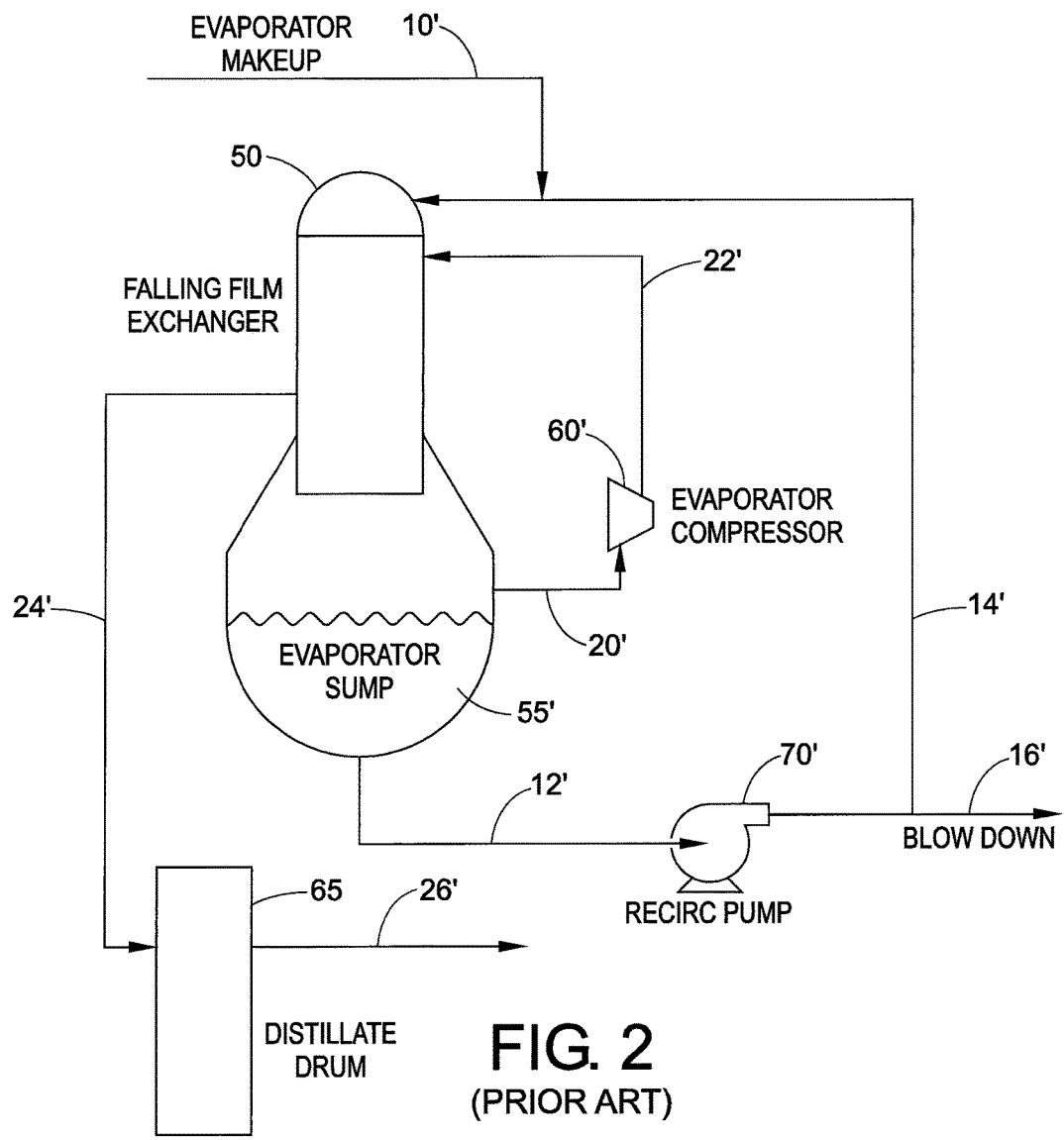
FIG. 2 shows the blowdown draw off from a known mechanical vapor compression evaporator, where the blowdown is taken from the bottom of an evaporator sump via a recirculation pump.

With reference to the known MVC system of FIG. 1, make-up water is fed via line 10 to an evaporator sump 55, either directly as shown or into a brine recirculation pump 70 and then via line 14 to a falling film exchanger 50. An evaporator brine is taken via line 12 from the bottom of the sump to the recirculation pump 70. Brine recirculation via line 14 comprises the majority of the stream which is pumped to a tube side of an evaporator exchanger 50. A smaller amount brine blowdown is removed via line 16 for disposal. In the evaporator exchanger 50, a small proportion of the brine is vaporized producing a two phase product from the tube side of the exchanger. The mixed brine and steam drop into the evaporator sump 55, where the liquid brine is recirculated once again and the vapor or steam stream is sent to an evaporator compressor 60 via line 20. The steam is compressed, raising its condensation temperature and is sent as evaporator steam via line 22 to a shell side of the evaporator exchanger 50. With its higher condensation temperature, it can be condensed in the exchanger while also providing the vaporization duty required to vaporize part of the brine on the tube side of the evaporator exchanger 50. The condensed steam from the shell side is the liquid evaporator distillate which flows via line 24 from the system. This goes to a distillate drum (65, see FIG. 2) and is subsequently discharged (see line 26' in FIG. 2).

Figure 3A:
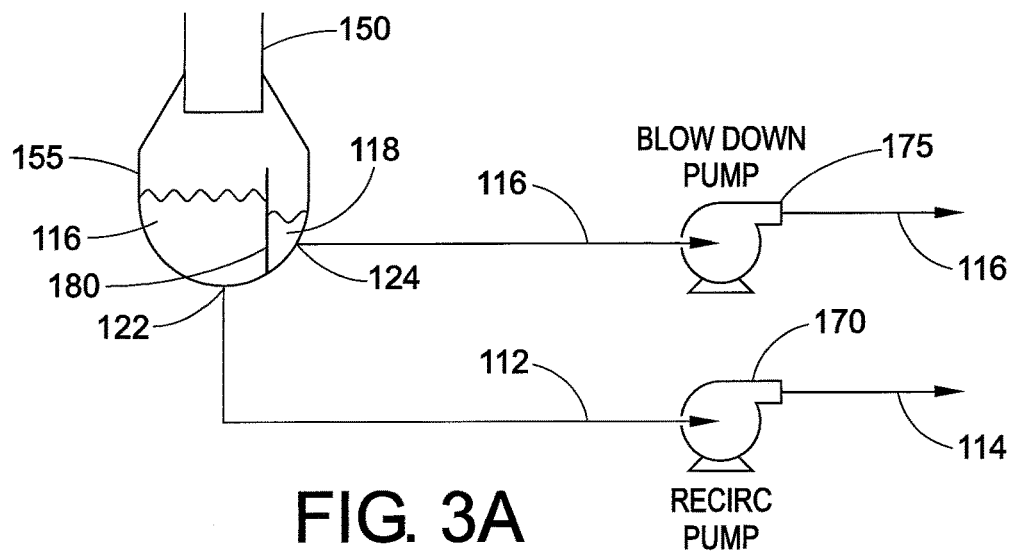
FIG. 3A shows an evaporator with an oversized sump illustrating one potential blowdown point.
Figure 3B:
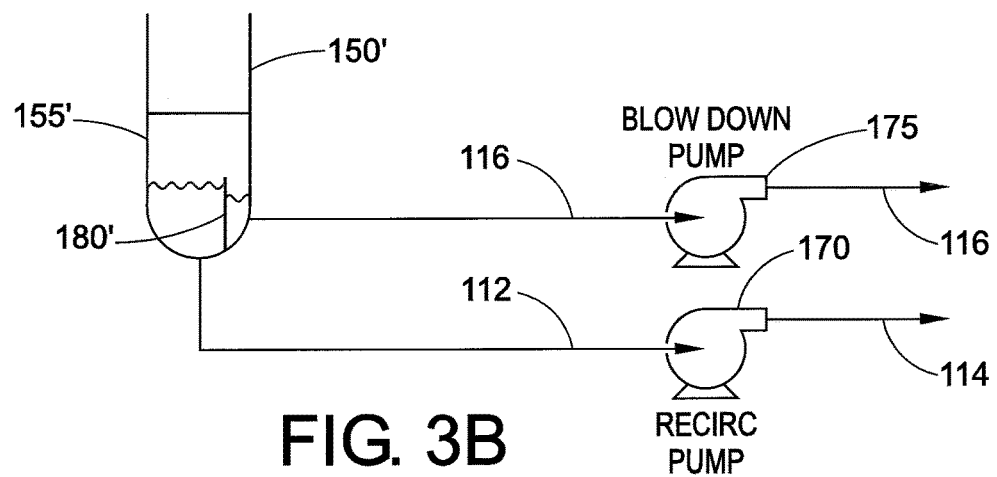
FIG. 3B shows an evaporator sump with a vertical sump of the same diameter as the evaporator exchange showing another potential blowdown point from the evaporator.
Figure 3C:
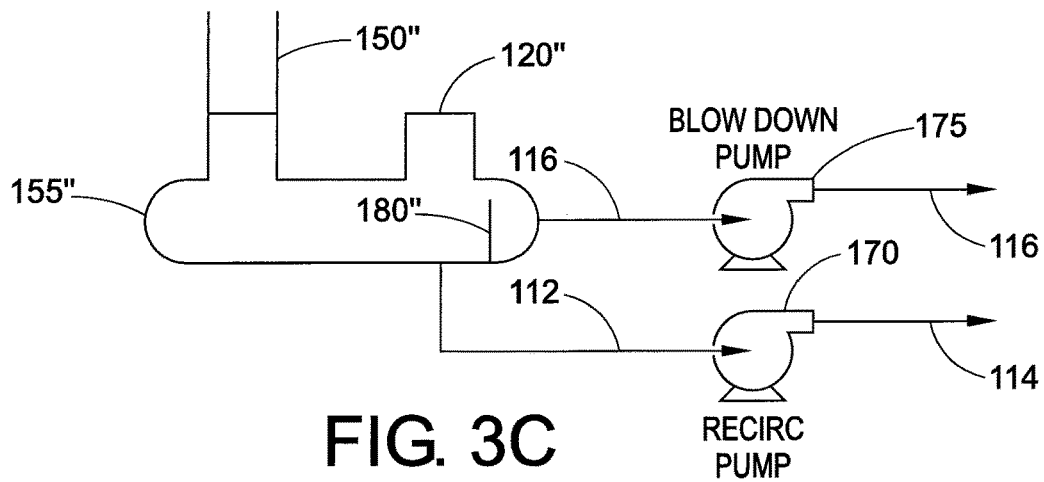
FIG. 3C shows a horizontal sump illustrating yet another potential blowdown point for an evaporator.

According to one aspect of the present disclosure, there is provided a solution for foaming comprising removing the oil that accumulates on the surface of the sump on a continuous basis. In one embodiment, the brine removal point is moved from an outlet of the brine recirculation pump or pumps to a blowdown sump incorporated into the evaporator sump, as illustrated in FIG. 3A. To achieve this, a vertical plate or weir 180 is added to the bottom sump section of the evaporator, separating it into a main sump 117 and a smaller blowdown sump 118. A brine removal point is located at an outlet 122 of the main sump 117 which is connected via a line 112 to one or more recirculation pumps 170. An outlet 124 of the blowdown sump 118 communicates via line 116 with a blowdown pump 175. This results in the ability to continuously remove oil from the evaporator via the blowdown sump 118 and thus prevent foaming events. This can be used in the evaporator systems utilizing an oversized vertical sump as illustrated in FIG. 3A. Moreover, such a design can also be employed in connection with an evaporator exchanger 150' as illustrated in FIG. 3B (see weir 180') or in a horizontal sump 150" as shown in FIG. 3C (see weir 180").

According to one aspect of the present disclosure, there is provided a water purification system in an oil recovery facility, the system comprising an evaporator and a set of controllers. The evaporator has a sump which is provided at the bottom thereof with an oil skimming weir that divides the sump into a main sump and a blowdown sump. Water containing impurities flows over the weir (such as weir 180 in FIG. 3A) from the main sump to the blowdown sump. In a normal operational mode, the evaporator receives water from the process and produces distilled water while discharging waste brine from the blowdown sump.

Figure 4A:
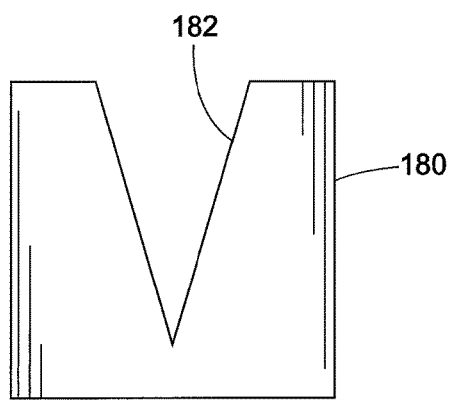
FIG. 4A shows an overflow weir including a v-notch according to the present disclosure.

With reference now to FIG. 4A according to another aspect of the present disclosure, the weir 180 separating the main sump and the blowdown sump can be provided with a v-notch 182 extending downwardly from the top wall of the weir. This embodiment is advantageous from the standpoint of allowing for variations in the main sump level, within the height of the v-notch, with a varying but continuous flow of brine to the blowdown sump, such as is illustrated in any of FIGS. 3A-3C. The location of a weir, such as a v-notch weir 180, and the evaporator is such that any hydrocarbon floating on top of the water of the main sump will be continuously removed from the evaporator with the waste brine. This results in the elimination of hydrocarbon related foaming events and the unit shutdowns associated with such foaming events. Employing a v-notch cutout 182 on the weir 180 provides a smoother control of the blowdown sump level because the level of fluid in the blowdown sump moves up and down the v-notch. The level in the main sump 116 can vary slightly while maintaining a constant flow to the blowdown sump 118, as illustrated in FIG. 3A.

Figure 4B:
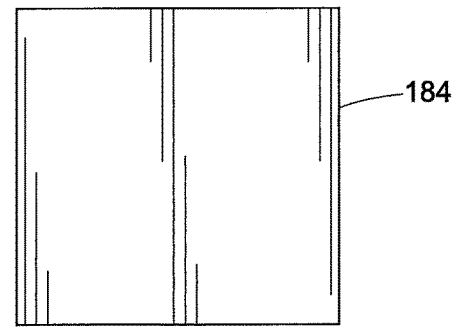
FIG. 4B shows a conventional horizontal weir.

Shown in FIG. 4B is a conventional weir 184 which does not have a v-notch cut out. As previously mentioned, hydrocarbon contamination is resolved according to the present disclosure by the use of an overflow weir, such as the v-notch weir 180, located at one end of the evaporator sump thereby creating a small blowdown sump. However, it should be recognized that a conventional weir 184, such as is illustrated in FIG. 4B, could also be employed. The hydrocarbons in the feed concentrate in the evaporator sump because they are lighter than the water. Brine will tend to concentrate at the top of the brine level. The hydrocarbon rich brine will flow over the weir and then can be pumped out of the system as required in order that it not accumulate in the evaporator sump.

As noted previously, one embodiment of the present disclosure is the addition of a vertical partition plate or weir 180, as illustrated in FIG. 4A and in FIG. 3A, to a bottom surge section of the evaporator, separating it into a main sump 116 and a smaller blowdown sump 118. Oil which accumulates on the surface of the main sump 116 continuously overflows into the blowdown sump 118 and is removed from the system as part of the blowdown stream via line 116. The main sump level is not controlled at a fixed point. Rather, the main sump level "floats" slightly within the range of the v-notch 182 (FIG. 4A) based on the evaporator inlet and brine outlet flows. On the other hand, the sump level in the brine blowdown sump 118 is controlled very tightly so as to provide a direct indication of flow from the main evaporator sump 116 into the blowdown sump 118.

Figure 5:
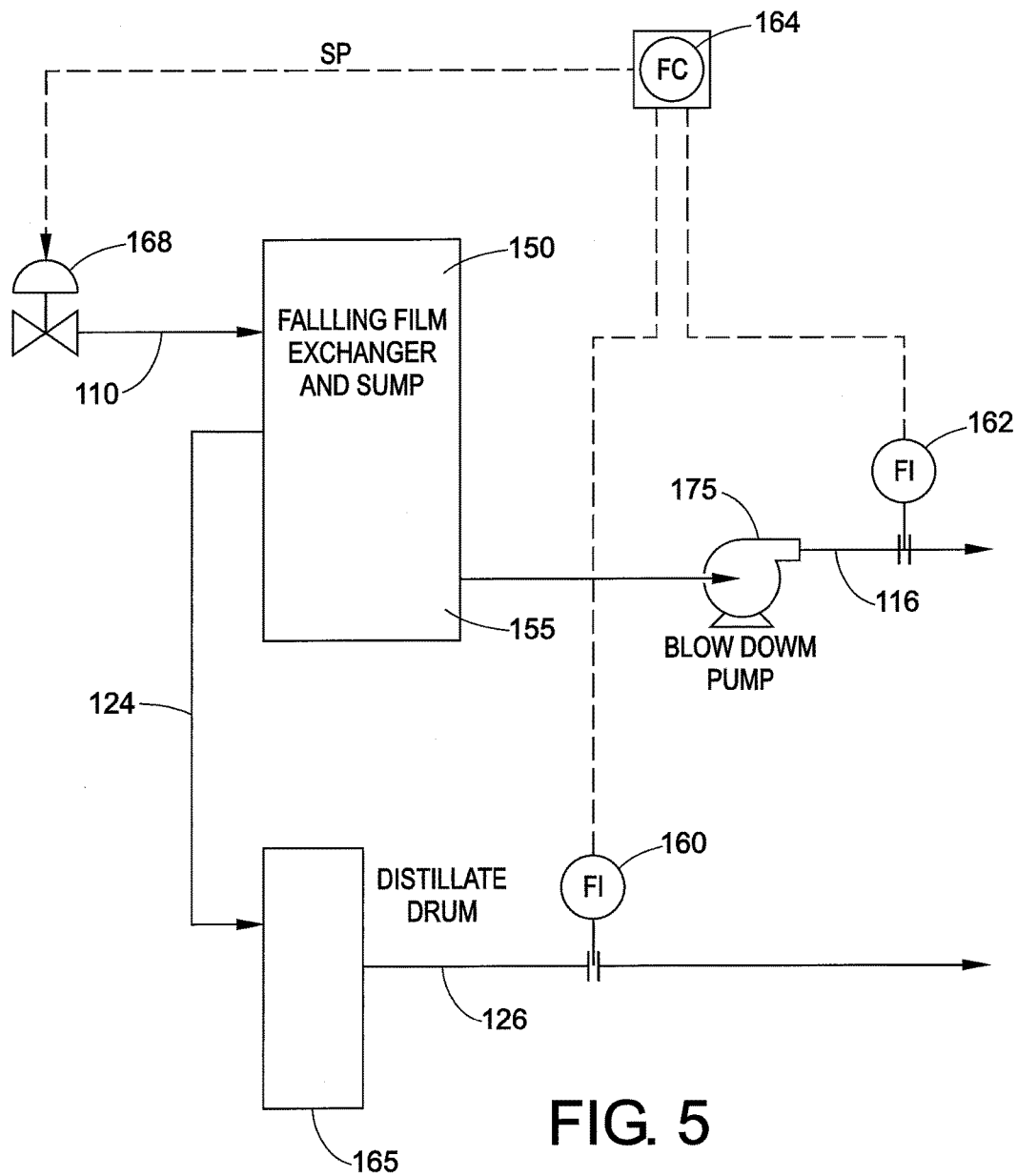
FIG. 5 is a schematic flow diagram illustrating a control system for an evaporator cycle calculator and flow control.

Also provided is a set of controllers for the system. With reference now to FIG. 5, there is provided a distilled water flow meter 160 which can be located before or after a distillate drum or tank 165. Also provided is a blowdown flow meter 162 for measuring the flow to or from a blowdown pump 175. A cycle calculator 164 is provided for calculating a ratio between distilled water flow and blowdown flow. Finally, a make-up flow controller 168 can be provided to regulate the amount of make-up water entering the exchanger and sump 150, 155.

In this case, the cycle calculator 164 provides a set point to a total flow controller. Thus, the flow of water into the evaporator exchanger 150 does not directly depend on the level of liquid in the main sump (116, FIG. 3A). Further, the operation of the evaporator 150 functions in a contained closed-loop environment. The make-up flow controller 168 can control the addition of make-up water directly, change the make-up, fill an upstream tank (not illustrated), or change the rate of make-up water to the plant.

According to this aspect of the present disclosure, the process includes the distillate tank 165 for receiving and dispensing distilled water. As mentioned, the distillate tank has a level controller 160 for controlling distilled water production. The distillate tank is the only major surge capacity in the process.

Figure 6:
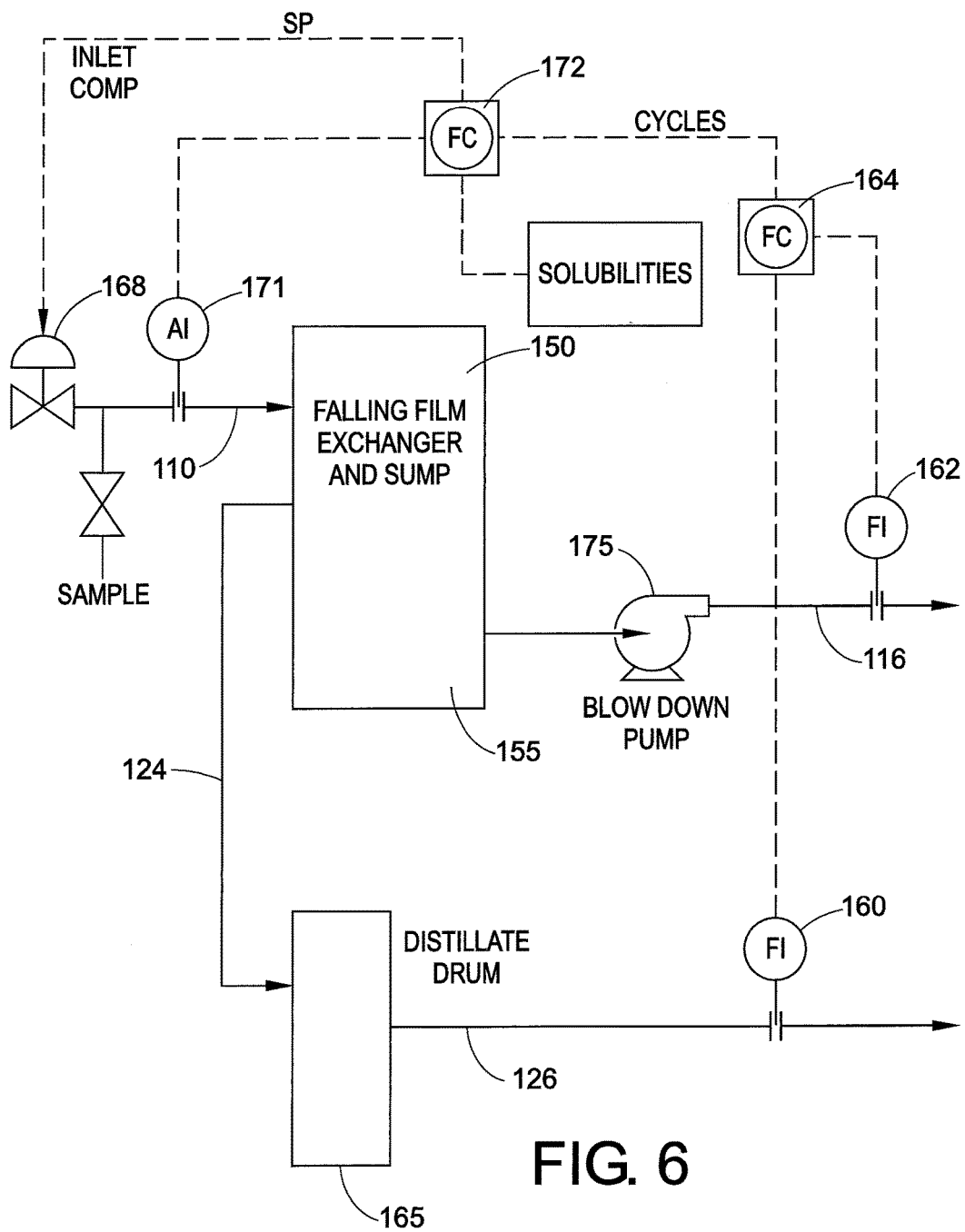
FIG. 6 is a schematic flow diagram that shows a dissolved solids control incorporated into the evaporator cycle calculator.

With reference now to FIG. 6, according to another aspect of the present disclosure, the set of controllers further comprises a hardness analyzer 171. The hardness analyzer 171 is used in the manipulation of the set point of a cycle controller 172, affecting the flow of make-up water into the process. The set point is set using an online analysis or feed sample analysis to determine the inlet hardness in the evaporator feed line 110. The flow of product distillate in line 126 is divided by the flow in the brine blowdown line 116 to estimate the number of cycles in the system. The number of cycles is multiplied by the hardness concentration to estimate the hardness concentration in the falling film exchanger 150 and sump 155. This is compared to the hardness solubility at the temperature of the liquid in the sump and a set point is provided to the inlet water controller 168 to ensure that the hardness concentration in the sump is lower than the hardness solubility in the sump. This ensures that the hardness remains in solution. The make-up flow controller 168 can control the make-up water directly, change the make-up or filling of an upstream tank or change the rate of make-up water to the plant. While set up for hardness, the same control methodology can be used with any other dissolved solids such as chlorides, carbonates, sulfates, etc. If an online feed analyzer is used, there will be periodic samples taken and analyzed for hardness to ensure that the online analyzer is calibrated properly.

Figure 7:
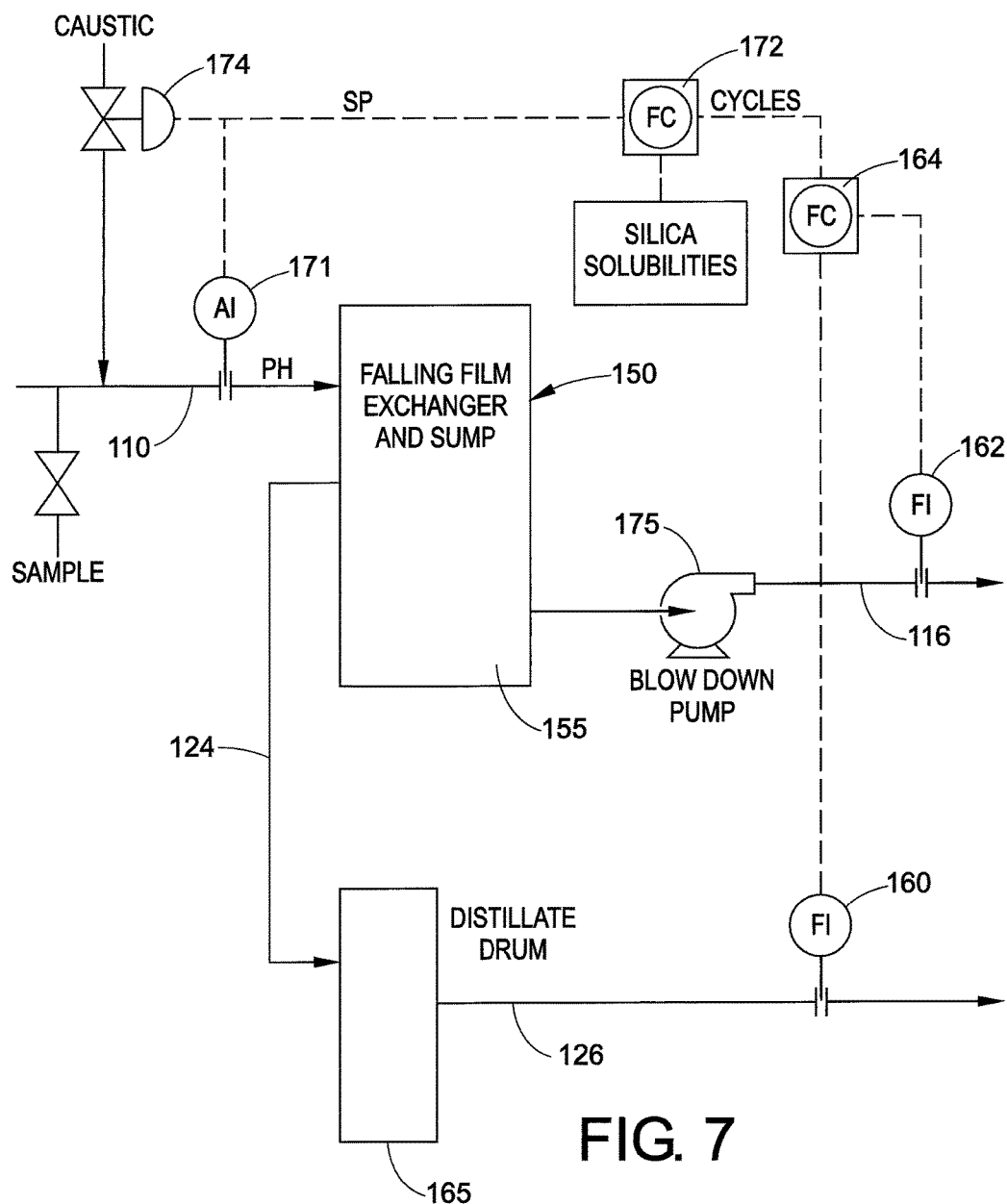
FIG. 7 is a schematic flow diagram showing silica controls incorporated into the evaporator cycle calculator and utilizing caustic to adjust the pH.
Figure 8:
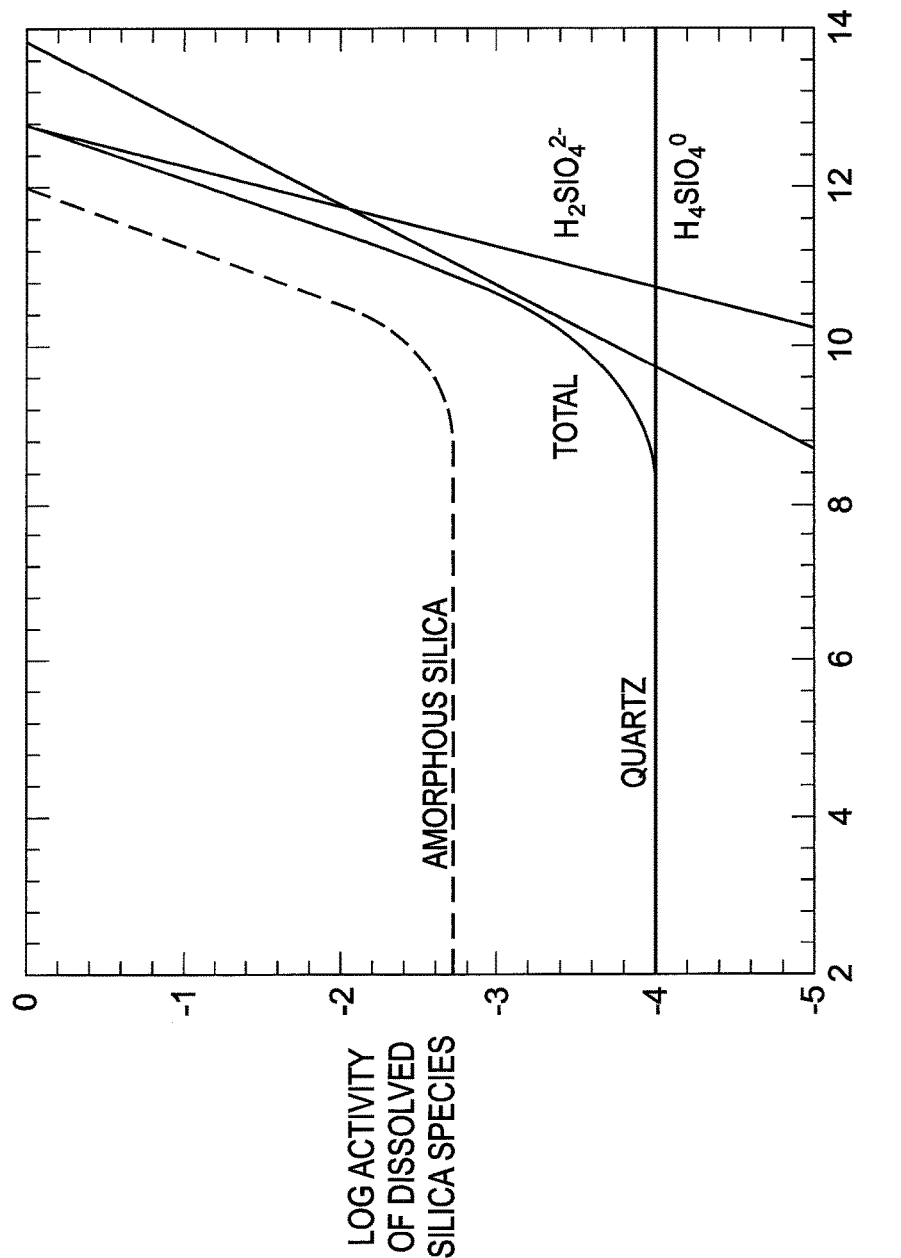
FIG. 8 is a graph illustrating the dependence of silica on pH.

With reference now to FIG. 7, the set of controllers can, in another embodiment, further comprise a silica controller 174. Silica is an issue when the source water is produced at a high temperature (above 40° C.). Silica behaves normally with temperature such that higher temperatures result in higher silica solubilities. At system feed temperatures, the inlet concentrations of silica are high enough that the silica will come out of solution at low cycles of concentration in the evaporator. The solution, as used elsewhere, is to increase the pH of the brine since the solubility of silica increases with pH as illustrated in FIG. 8. The controller 174 adjusts the feed pH with a caustic material based on an estimate of the silica concentration in the sump 155 rather than utilizing a fixed pH set point typically used in the industry. The silica controller 174 manipulates the set point of the caustic addition to the make-up water flowing in line 110 in the process as fed to the exchanger 150.

The set point is set using an online pH analysis to determine the inlet pH in the evaporator feed line 110. The inlet silica concentration can be determined either through an online analysis or by analyzing a feed sample. The flow of product distillate via line 126 is divided by the flow of brine blowdown sampled in line 116 to estimate the number of cycles in the system. The number of cycles is multiplied by the feed silica concentration to estimate the silica concentration in the sump. This is compared to the silica solubility with the pH curve (see FIG. 8) to obtain a desired sump pH, ensuring a sufficient margin that the silica will remain in solution. The pH in the sump is a function of feed pH and the number of cycles (pH is a measure of the concentration of hydrogen ions in solution). As the feed water is concentrated, the concentration of hydrogen ions increases correspondingly. This calculation will then estimate the required pH in the feed water to obtain the desired sump pH. Caustic is added to the feed water in line 110 as regulated by controller 174 to produce the desired feed pH. If an online silica feed analyzer is used, there will be periodic samples taken and analyzed for silica to ensure that the online analyzer is calibrated properly.

Figure 9:
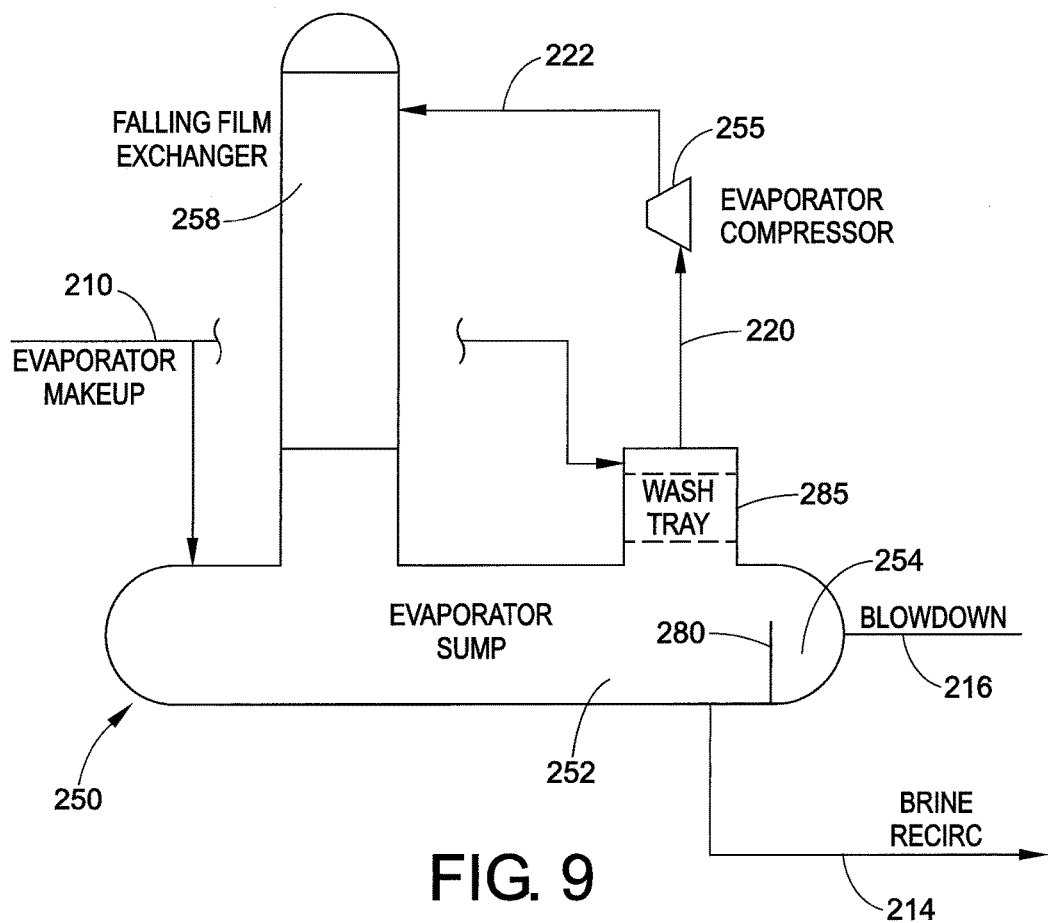
FIG. 9 shows a wash tray incorporated into a horizontal sump for the evaporator of FIG. 3C, with this embodiment of the disclosure using a slipstream of the evaporator feed as the source for the wash water according to a further embodiment of the present disclosure.

With reference now to FIG. 9, an evaporator sump designed as a horizontal sump 250 is there illustrated. The evaporator sump is separated by a weir 280 into a main sump 252 and a blowdown sump 254. The sump 250 has an evaporator exchanger diameter nozzle directly coupled to a falling film exchanger 258 located close to one end of the sump 250. Evaporator blowdown is taken via line 216 from the blowdown sump 254 while brine is removed via line 214 for recirculation. The brine is drawn off from the opposite side of the sump from the falling film exchanger 258. A steam nozzle is employed to withdraw steam via line 220 which leads to an evaporator compressor 255 and subsequently via line 222 to the falling film exchanger 258.

Communicating with the steam line is a water wash section 285 including a wash tray, mounted to the sump 250, where the steam and the entrained brine are contacted with wash water feed. This has the dual purpose of reducing the total liquid entrainment in the steam and to replace the liquid that is entrained from the original high concentration brine to the low concentration feed water. This reduces the amount of salt deposited downstream of the steam nozzle when the steam is super-heated either through a recycle of hot compressor discharge steam back to the suction or in the compressor itself. Such deposited salt can cause corrosion issues in the piping and the compressor and deposition issues (such as compressor balancing deposition effecting flow through tight clearances, etc.). The brine feed water can be taken as a slip stream from the evaporator feed, utility water, boiler feed water, or any other source of relatively clean water. It should be recognized that the cleaner the wash water, the lower the resulting salt deposition downstream of the wash section. The wash section can comprise conventional trays, high efficiency trays, layers of random packing material, or layers of structured packing material.

The choice between these options is a function of cost, desired liquid loading, pressure drop, and liquid distribution.

Figure 10:
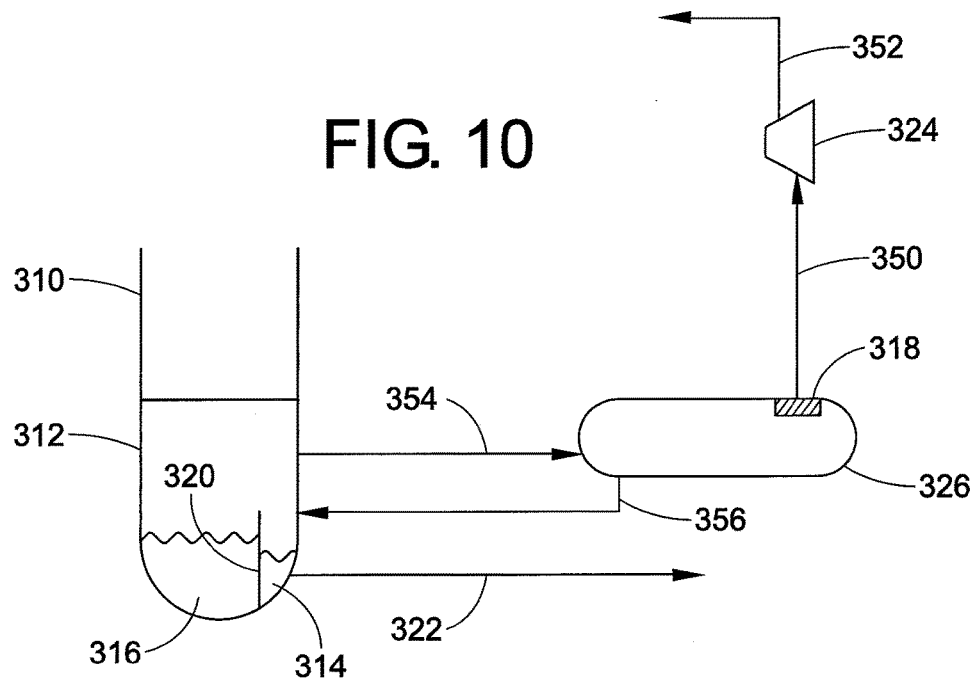
FIG. 10 is a schematic flow diagram of a system according to another embodiment of the present disclosure.
Figure 11:
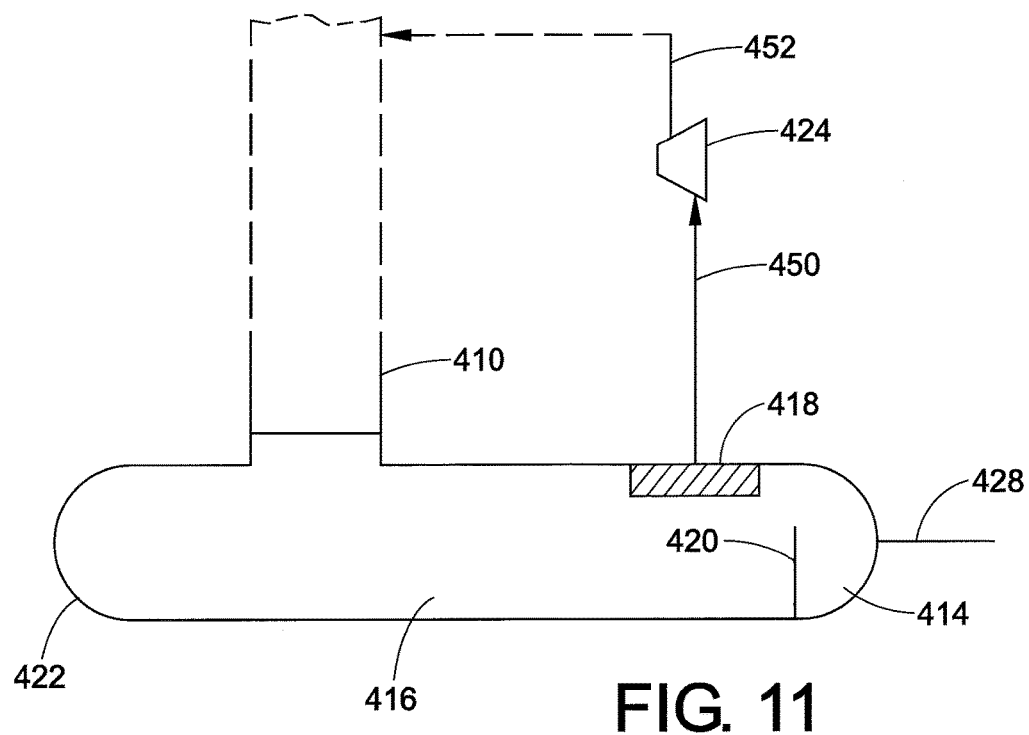
FIG. 11 is a schematic flow diagram of a system according to still another embodiment of the present disclosure.

Two other versions of a sump with a wash section are illustrated in FIGS. 10 and 11. In the embodiment illustrated in FIG. 10, an evaporator exchanger 310 includes a sump 312 which has mounted therein a weir 320 that divides the sump 312 into a main portion 316 and a blowdown portion 314. Communicating with the blowdown sump 314 is a blowdown sump outflow line 322. A main sump up flow line 354 leads from the sump 312 to a compressor knockout drum 326. The compressor knockout drum is provided with a wash tray 318 spaced well away from the inlet from line 354. A flow line 350 leads from the wash tray of the evaporator sump 326 to an evaporator compressor 324. The outflow from the evaporator compressor flows via line 352 back to the evaporator exchanger 310. The brine remaining in the evaporator sump 316 flows back to the sump portion 312 of the evaporator exchanger 310 and particularly to the blowdown sump 314 thereof. The brine discharge from the main sump 316 is not illustrated in the embodiment of FIG. 10 for the sake of simplicity.

With reference now to FIG. 11, disclosed therein is a horizontally oriented evaporator sump 410 which is provided with a wash tray. More particularly, the evaporator sump 410 includes a sump portion 422 which comprises a main section 416 and a blow down section 414 separated by a weir 420. Positioned atop the sump portion 422 is a wash tray 418 which communicates via a line 450 with an evaporator compressor 424. The output of the evaporator compressor flows via line 452 back to the evaporator exchanger portion of the evaporator sump 410. Brine from the blowdown sump 414 flows away from the evaporator sump via line 428. The brine discharge line is not illustrated in FIG. 11 for the sake of simplicity.

It should be appreciated that the control systems illustrated in FIGS. 5-7 can be employed with the evaporator exchangers and evaporator sumps illustrated in FIGS. 9-11. There, the control systems are not again shown for the sake of simplicity and ease of comprehension. However, the control system, i.e. the plurality of controllers including a distilled water flow meter, a blowdown flow meter, a cycle controller, a total flow controller, a hardness controller, and a silica controller can be and generally are employed in some combination with the evaporator exchanger and evaporator sump shown in the embodiments of FIGS. 9-11.

According to yet another aspect of the present disclosure, besides the normal mode of operation, the evaporator also has two additional modes of operation. These are an idle mode and a recycle mode.

During the idle mode there is no flow in or out of the evaporator and during the recycle mode, the distilled water is recycled to the inlet of the evaporator. These modes can be initiated when starting up the evaporator, when shutting down the evaporator, when there is a loss of flow, and in response to malfunctions in the system. Such malfunctions include a compressor malfunction, a pump malfunction, or a boiler malfunction. The evaporator may be operated in such modes automatically or this may be initiated by an operator.

The recycle mode is generally used during a shutdown procedure and after a malfunction such as a boiler malfunction. The idle mode may be used after a compressor malfunction.

In one embodiment, water hardness is controlled by measuring the hardness in the feed water, estimating the hardness in the sump via flow meters and calculators that determine the number of cycles in the evaporator, comparing the estimated sump hardness to the maximum hardness before precipitation occurs, and then setting the blow down rate to ensure that the maximum hardness is not reached. The blowdown rate will cause the evaporator feed rate to change either directly, via flow in or out of an upstream tank, or via make-up water to the facility.

In one embodiment, silica is controlled by measuring the silica in feed, estimating the silica concentration in the sump via flow meters and calculators that determine the number of cycles in the evaporator. There is a solubility curve of silica as a function of pH which sets the desired pH in the sump. The concentration effects on the sump pH and the desired sump pH are then used to determine the desired evaporator feed pH which is controlled by the appropriate caustic addition.

According to the present disclosure, as shown in FIGS. 9-11, compressor and compressor suction piping corrosion are resolved by the use of a horizontal evaporator sump and wash trays on the steam outlet from the sump before entering compressor suction piping. The water wash source can be the slip stream of feed water for the evaporator. The wash trays can comprise either conventional or high efficiency trays or layers of structured or random packing. The steam enters the wash trays and comes into contact with the wash water. Leaving the wash tray section, any entrained liquids will approach the feed water composition rather than the concentrated brine composition, greatly reducing the amount of entrained dissolved solids and the resulting corrosion caused thereby. The wash tray concept is similar to that used on caustic tower and amine new generation towers to minimize the losses of caustic and amine respectively.

Figure 12:
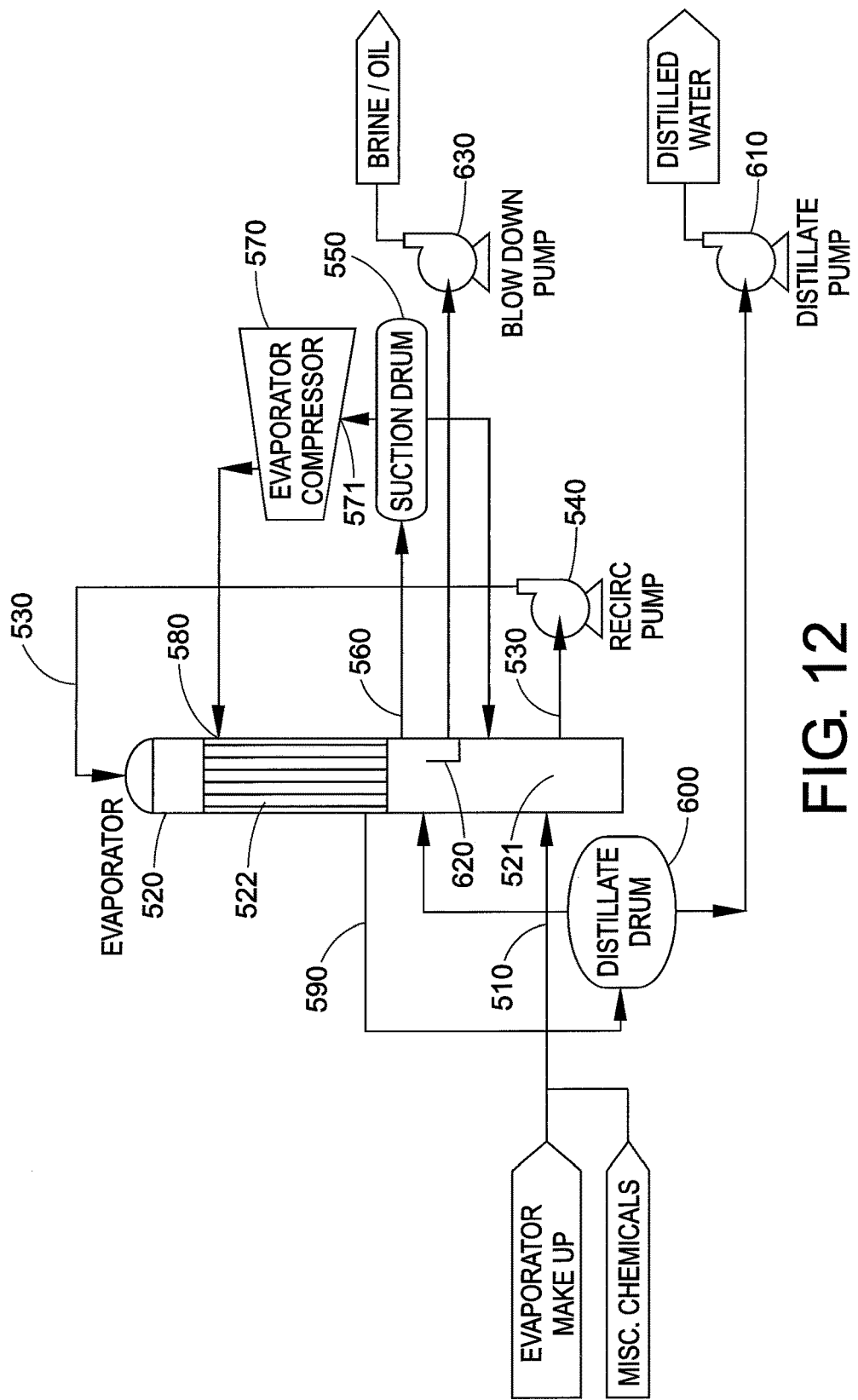
FIG. 12 is a schematic process flow diagram according to yet another embodiment of the present disclosure.

With reference now to FIG. 12, it can be seen that feed water, including produced water and miscellaneous chemicals as well as make-up water, flows via line 510 to a sump 521 of an evaporator 520. Brine flows via line 530 and is recirculated from the evaporator sump by one or more recirculation pumps 540 through a tube side of a falling film evaporator 522. The vaporization rate per tube pass due to the shorter tubes (shorter relative to typical falling film evaporators in SAGD water treatment service) will reduce the likelihood of scaling on the tube surface. A small portion of the water will evaporate in the tubes.

In this embodiment, an external compressor suction drum 550 is used to remove any entrained water droplets in the steam drawn from the evaporator sump 521 via line 560 before the vapors enter a compressor 570. The suction drum can be a standard suction drum common to compressors. This design replaces the current combined falling film evaporator with an integrated large diameter sump acting as the compression suction drum. In order to eliminate the contamination of the distillate, the prior art design employs a mist eliminator with a distillate water wash. But, the mist eliminator is prone to fouling and a distillate wash reduces the net production of distillate. In contrast, in the instant design the compression suction drum 550 can be designed without a mist eliminator and still achieve the same removal of contaminants. If a mist eliminator is employed to reduce the size of a vessel, the mist eliminator can be located at the vapor draw from the vessel (see FIGS. 9-11). Such an eliminator can be located as far horizontally from the vapor with mist inlets to the vessel as is feasible (see FIG. 10). This design will reduce the size of the required mist eliminator to achieve the required vapor/liquid separation.

With the compressor suction drum 550 being located upstream of a compressor inlet 571, the amount of liquid carry over to the compressor, which will contaminate the distillate, will be reduced (without the need for mist eliminating pads and mist eliminating pad washing). Therefore, the achieved quality of the distillate will be improved or the capacity of distillate produced will be increased.

The evaporator compressor 570 increases the pressure and temperature of the steam produced from the circulating brine and sends it to a shell side 580 of the falling film evaporator 522. Heat exchanged between the vapor and water acts to condense the steam on the shell side 580 of the evaporator 522 into distilled water, and evaporates a similar volume of water from the brine being circulated on the tube side of the falling film heat exchanger 520. The distillate drains to a distillate drum or tank 600 where any vapor flashes and can be returned to the evaporator sump 521. Distillate is pumped via a pump 610 to downstream consumers.

The circulating water on the tube side of the falling film heat exchanger becomes concentrated in dissolved solids as water is distilled off in the form of steam. This water is thus referred to as brine. The brine falls from the tubes into the evaporator sump 521. The vessel also includes a weir 620. Brine and accumulated oil or hydrocarbons which could otherwise accumulate and cause foaming and fouling, overflow the weir and are removed by one or more blowdown pumps 630. Brine can also be removed at the discharge of one or more brine recirculation pumps 540 if necessary on an intermittent basis.

Figure 13:
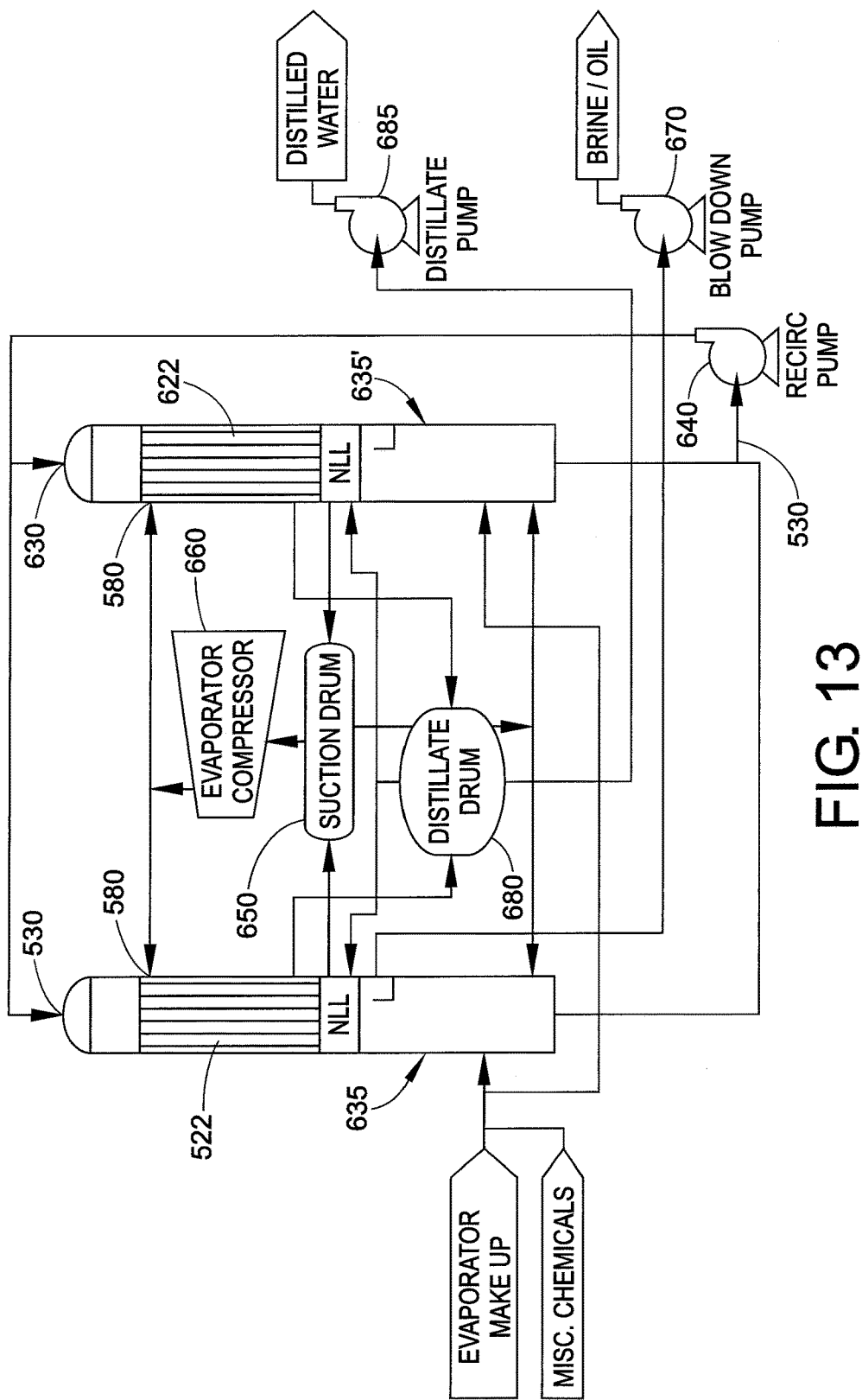
FIG. 13 is a schematic process flow diagram of a further embodiment of the present disclosure providing a combination of two evaporators.

With reference now to FIG. 13, illustrated there are two falling film evaporators 635 and 635' coupled to a common brine circulation pump 640, a common compressor suction drum 650 and a common compressor 660, a common brine disposal pump 670, and a common distillate drum 680 which is connected to a distillate pump 685. This option increases the overall capacity of a single modular evaporator system and provides two separate heat exchangers 635 and 635'. Each of these can be isolated from the system for maintenance while the other exchanger remains in service.

In this design, all feeds and products are split between the two exchangers. From an operating perspective, this configuration allows the facility to operate at full rates for a short period of time by balancing with boiler feed water inventory or at reduced rates for an extended period of time when an exchanger is down for cleaning. Normally, the primary reason for an evaporator outage is to clean the exchanger, but this requires an outage of approximately 12 to 24 hours.

In the event that one of the two exchangers 635, 635' is taken off-line for cleaning, the system capacity will be greater than 50% since the compressor 660 will develop more pressure and temperature at lower rates and thus increase the temperature differential between the tube side and shell side of the falling film heat exchanger.

The brine circulation rate will increase and the vaporization rate will also increase in the remaining online exchanger. For a clean exchanger, this actual rate will be closer to 75%. For a dirty exchanger (assume cleaning takes place when combined distillate is 80% of design) than the actual rate will be approximately 60% of design.

Figure 14:
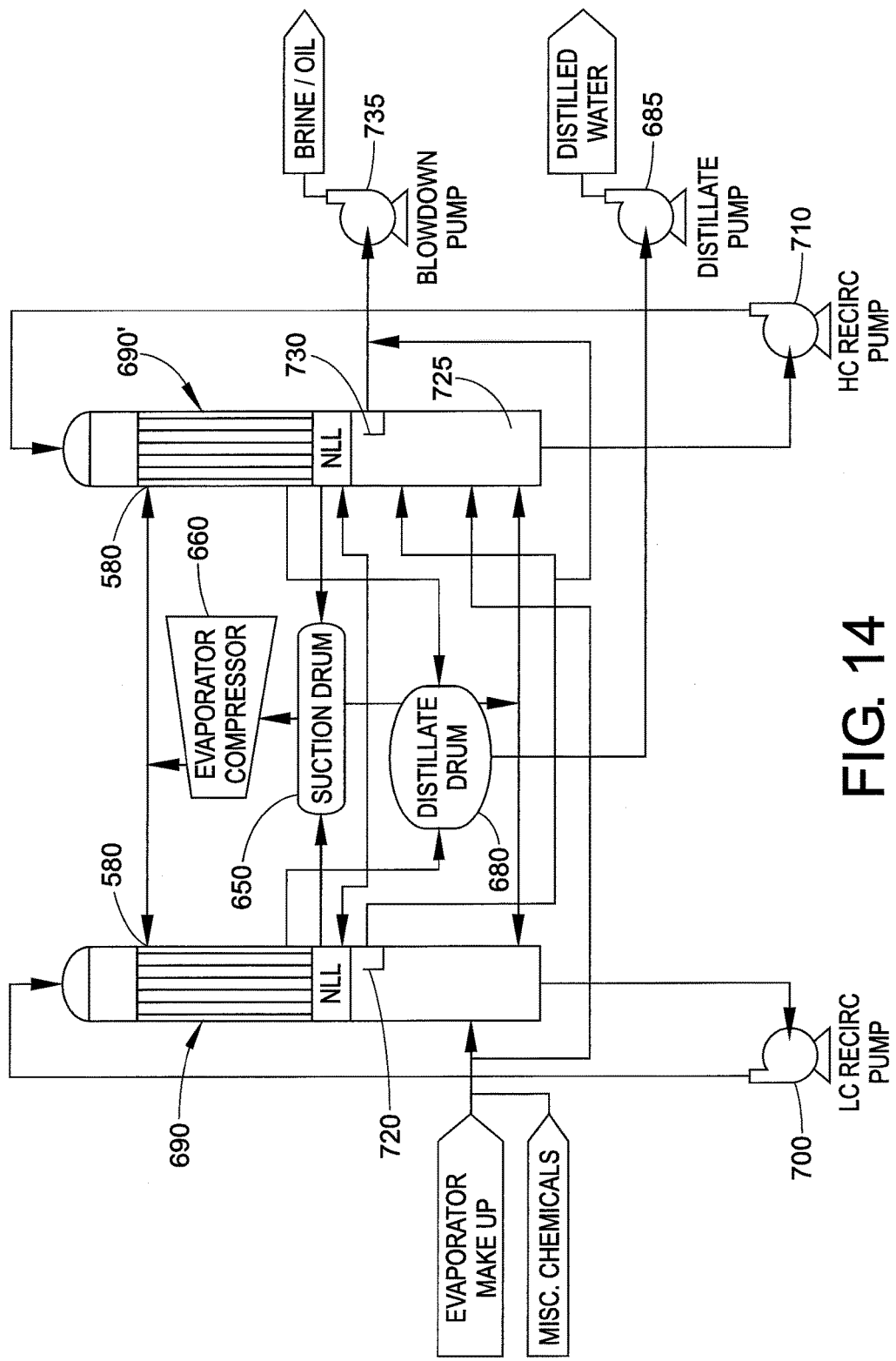
FIG. 14 is a schematic process flow diagram of a yet further embodiment of the present disclosure provided with a dual evaporator and dual concentration design.

Yet another configuration of the dual exchanger design is illustrated in FIG. 14. This design is set to operate at different concentrations in each of two falling film heat exchangers 690 and 690'. These can be termed a low concentration exchanger 690 and a high concentration exchanger 690'. This configuration can be used to reduce either the compressor horse power requirement for similar sized evaporator exchangers or to increase system capacity for the same compressor horse power. However, this system does require independent brine circulation systems.

In this case, the inlet water (including any necessary chemicals) is fed to the low concentration exchanger 690. The lower concentration in the first evaporator reduces the boiling point of the brine and thus increases the differential temperature between the brine boiling point and the vapor condensing in the exchanger for a given compressor flow and pressure. This feature can be used to either increase the capacity of the exchanger for a given compressor power or to decrease the compressor power for a given exchanger capacity. In order to keep the concentrations different between the two exchangers 690 and 690', each exchanger requires its own recirculation pump 700 (low concentration pump) and 710 (high concentration pump). The brine from the low concentration exchanger overflows a weir 720 (to ensure any oil collected is also transferred to the high concentration exchanger 690') and is routed to a sump 725 of the high concentration exchanger 690'. The sump of the high concentration exchanger 690' is equipped with a similar skimming weir 730 and the brine and any accumulated oil overflows that weir and is routed to a brine disposal tank via a blowdown pump 735. The relative size of the two exchangers 690 and 690' can be varied. In one embodiment, the minimum compressor horse power is reached at roughly a 70:30 exchanger size ratio between the low and high concentration evaporators.

With this evaporator configuration, the low concentration exchanger 690 is less likely to foul given the low brine concentration and the removal of all oil. The piping can then be arranged to allow the cleaning of the high concentration exchanger 690' while keeping the low concentration exchanger online. Similar to the dual exchanger design, distillate production will be greater than the nominal 70% of design capacity because of the increased liquid and vapor flow to the exchanger. It is estimated that the system capacity will be approximately 85% of original design.

In the present disclosure, shorter heat exchanger tubes are employed and this reduces the vaporization rate per tube pass which, in turn, reduces the fouling rate on the exchanger tube surfaces. The shorter tubes also reduce the overall height of the unit. This dimensional flexibility allows greater capacities to fit within specific module dimensions.

The effective oil skimmer design, using a weir in the evaporator sump eliminates oil accumulation and excessive foaming. This will dramatically reduce the probability of foam overflowing or being entrained into the evaporator compressor where it can cause vibrations, scaling, and eventually damage to the compressor. As a result, the design discussed herein will reduce the number of unexpected shutdowns and the inherent risk of the design will decrease.

In this embodiment, the use of an external compressor suction drum may be more effective than an internal mist eliminator on evaporators where the compressor suction drum is integrated in the evaporator sump. The compressor suction drum can however be fitted with a mist eliminating pad to ensure contaminants do not carry over to the compressor inlet and potentially foul the compressor rotor and the shell side exchanger surfaces. In addition, the design will reduce or eliminate the need to recycle distilled water to washing vessel internals.

The distillate drum 680 provides a larger holdup/surge time for downstream controllers than in typical designs. As a result, the distilled water flow can be controlled smoothly. This means that the distilled water can be directly pumped to the downstream consumer, i.e. the boiler via a distillate pump 685. Moreover, heat in the water can be conserved. If there is a decrease in the boiler rate, there is more capacity to temporarily hold up distillate in the distillate tank and adjust the evaporator throughput rather than diverting produced distillate to a storage tank while the evaporator is adjusted. This will increase the overall efficiency of the system.

As with the embodiments of FIGS. 9-11, the embodiments of FIGS. 12-14 can similarly be (and usually are) provided with at least some of the plurality of controllers including the distilled water flow meter, the blowdown flow meter, the cycle controller, the total flow controller, the hardness controller, and the silica controller that were discussed in connection with FIGS. 5-7. These are not illustrated in FIGS. 12-14 for ease of comprehension. Neither is the wash tray shown in FIGS. 9-11 illustrated in FIGS. 12-14, for the same reason.

Figure 15:
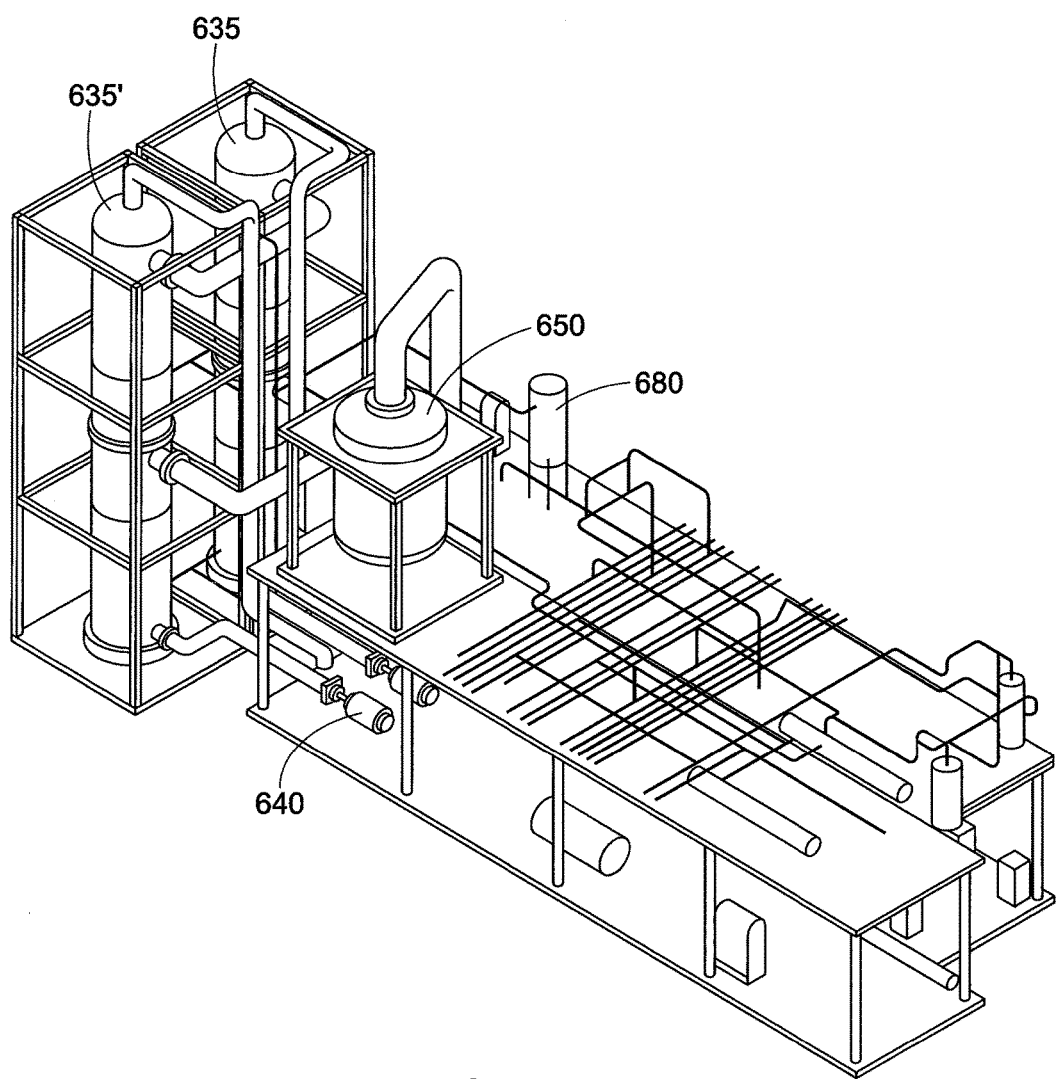
FIG. 15 is a schematic isometric illustration of a modular mobile compact evaporator system of the embodiment of FIG. 13 in modular form; and, FIG. 16 is a schematic illustration of a single module of a mobile evaporator unit positioned on a truck.

Overall, the design illustrated herein will be more easily modularized and transported for small scale SAGD facilities. The use of relatively shorter tubes in the evaporator exchanger reduces the height of the exchanger bundle. Together, the evaporator exchanger and evaporator vessel will be smaller in diameter and height than typical evaporator exchanger and sump vessel designs. This will facilitate the construction of a module that can be shipped on its side to a remote site. The other pieces of equipment including the evaporator vapor compressor, the distillate vessel, and the evaporator mist eliminating vessel can be included on other modules with other SAGD equipment to achieve an optimal modularized layout. One such layout is illustrated in FIG. 15. Disclosed therein are two falling film evaporators 635 and 635', a common brine circulation pump 640, a common compressor suction drum 650, and a common distillate tank 680.

Figure 16:
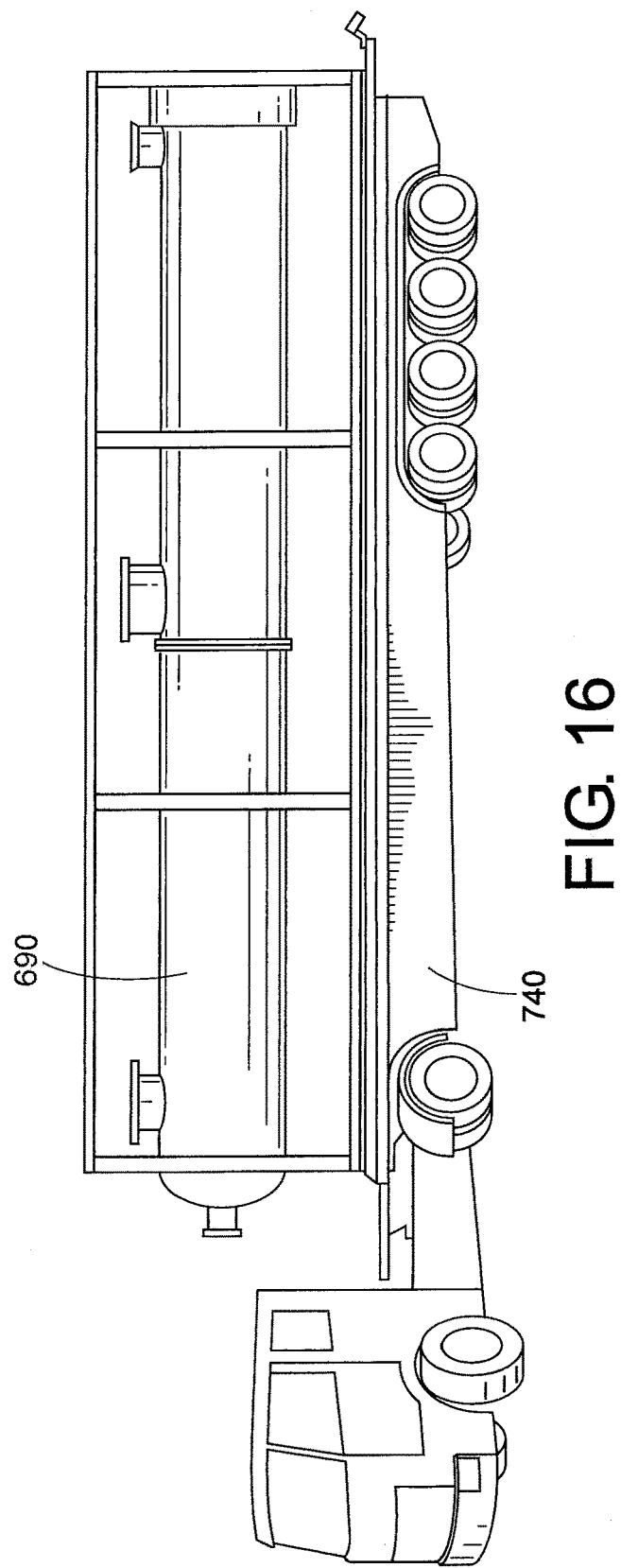

With reference now to FIG. 16, shown there is the exchanger 690 transported on a truck 740.

In the case of falling film heat exchangers, the maximum height thereof is set by the need to not precipitate out solids when evaporating water from the brine in each tube. When the tube gets longer, one needs more water per tube to ensure that the concentration of dissolved solids (silica and hardness) at the bottom of the tube won't precipitate out. With a given diameter of tube, there is a practical limit where the vapor flow down the tube will cause dry areas and precipitation inside the tubes. This sets the maximum height of a tube. The minimum height of the tube is set by the ability to evenly distribute brine to each of the tubes, the maximum diameter of the exchanger can be made such that it is a diameter such that the exchanger can be transported as shown in FIG. 16.

The disclosure has been described with reference to several embodiments. Obviously, modifications and alterations will occur to others upon a reading and understanding of this specification. It is intended that this disclosure include all such modifications and alterations insofar as they come within the scope of the appended claims or the equivalents thereof.

The invention claimed is:

1. A process for evaporative water purification in an oil recovery facility, comprising:
    providing an evaporator, including a sump, and a weir;
    employing the weir to divide the sump into a main sump and a blowdown sump;
    flowing a liquid including brine and oil in a continuous manner over the weir from the main sump into the blowdown sump in order to retard a foaming of the oil in the sump;
    discharging brine from the main sump and circulating the brine to the evaporator;
    discharging oil from the blowdown sump and removing the oil from the system; and
    controlling a level of liquid in the blowdown sump.

2. The process of claim 1 further comprising the step of continuously discharging the oil from the blowdown sump.

3. The process of claim 1 further comprising the step of controlling a silica solubility in a circulating liquid.

4. The process of claim 3 wherein the step of controlling silica solubility includes adjusting a pH of the circulating liquid.

5. The process of claim 4 wherein the pH is adjusted by adding at least one chemical solvent to the circulating liquid.

6. The process of claim 1 further comprising controlling a hardness of a circulating liquid.

7. The process of claim 6 wherein the step of controlling the hardness of the circulating liquid includes adjusting a brine blow down rate.

8. The process of claim 2 further comprising the step of continuously removing the oil from the system.

9. An evaporative water purification process utilized in an oil recovery facility, comprising:
    providing an evaporator, including a sump, and a weir;
    employing the weir to divide the sump into a main sump portion a blowdown sump portion;
    flowing in a continuous manner a liquid including brine and oil over the weir from the main sump portion into the blowdown sump portion, thereby retarding a foaming of the oil in the liquid;
    discharging brine from the main sump portion and circulating the brine to the evaporator;
    discharging oil from the blowdown sump portion;
    removing the oil from the system; and,
    discharging a steam from the evaporator into a distillate drum.

10. The process of claim 9 further comprising the step of continuously discharging the oil from the blowdown sump.

11. The process of claim 10 further comprising the step of continuously removing the oil from the system.

12. The process of claim 9 further comprising the step of controlling a silica solubility in the brine.

13. The process of claim 12 wherein the step of controlling silica solubility includes adjusting a pH of the brine.

14. The process of claim 8 further comprising calculating a ratio between a distilled water flow from the distillate drum and a blowdown flow from the blowdown sump portion.

15. The process of claim 9 further comprising controlling a hardness of the brine.

16. The process of claim 15 wherein the step of controlling the hardness of the brine includes adjusting a brine blow down rate.

17. A process for evaporative water purification in an oil recovery facility, comprising:
    providing an evaporator, including a sump, and a weir;
    employing the weir to divide the sump into a main sump portion and a blowdown sump portion;
    flowing a liquid including brine and oil over the weir from the main sump portion into the blowdown sump portion;
    discharging brine from the main sump portion and circulating the brine to the evaporator;
    discharging oil from the blowdown sump portion;
    allowing the liquid in the main sump portion to flow into the blowdown sump portion in an uninterrupted manner via a v-shaped notch disposed in the weir in order to retard a foaming of the oil in the liquid;
    removing the oil from the system;

measuring a flow of the liquid from the blowdown sump portion; and discharging a steam from the evaporator.

18. The process of claim 17 further comprising the step of continuously discharging the oil from the blowdown sump portion.

19. The process of claim 18 further comprising continuously removing the oil from the system.

* * * * *